United States Patent
Guch, Jr. et al.

(10) Patent No.: US 6,219,361 B1
(45) Date of Patent: Apr. 17, 2001

(54) SIDE PUMPED, Q-SWITCHED MICROLASER

(75) Inventors: Steve Guch, Jr., Mount Dora; Charles L. Stonecypher, Winter Park, both of FL (US)

(73) Assignee: Litton Systems, Inc., Charlotte, NC (US)

( * ) Notice: Subject to any disclaimer, the term of this patent is extended or adjusted under 35 U.S.C. 154(b) by 0 days.

(21) Appl. No.: 09/337,716

(22) Filed: Jun. 21, 1999

(51) Int. Cl.$^7$ ............................................ H01S 3/11
(52) U.S. Cl. ........................ 372/10; 372/66; 372/92; 372/75
(58) Field of Search ........................... 372/10, 66, 92, 372/69, 70, 75

(56) References Cited

U.S. PATENT DOCUMENTS

| | | |
|---|---|---|
| 3,810,041 | 5/1974 | Martin . |
| 4,191,931 | 3/1980 | Kuppenheimer . |
| 4,894,839 | 1/1990 | Baer . |
| 4,953,166 | 8/1990 | Mooradian . |
| 5,305,345 | 4/1994 | Albrecht et al. . |
| 5,394,413 | 2/1995 | Zayhowski . |
| 5,408,480 | 4/1995 | Hemmati . |
| 5,455,838 * | 10/1995 | Heritier et al. ........................ 372/75 |
| 5,463,649 | 10/1995 | Ashby et al. . |
| 5,479,430 * | 12/1995 | Shine, Jr. et al. ..................... 372/66 |
| 5,488,619 | 1/1996 | Injeyan et al. . |
| 5,546,416 * | 8/1996 | Basu ....................................... 372/66 |
| 5,555,254 * | 9/1996 | Injeyan et al. ........................ 372/66 |
| 5,732,100 | 3/1998 | Thony et al. . |
| 5,832,010 | 11/1998 | Fulbert et al. . |
| 5,844,932 | 12/1998 | Thony et al. . |
| 5,991,315 * | 9/1998 | Injeyan et al. ........................ 372/66 |
| 6,134,258 * | 10/2000 | Tulloch et al. ........................ 372/66 |

FOREIGN PATENT DOCUMENTS 5-7046   1/1993   (JP) .

\* cited by examiner

*Primary Examiner*—Leon Scott, Jr.
(74) *Attorney, Agent, or Firm*—Alston & Bird LLP

(57) ABSTRACT

A microlaser is provided that has a microresonator and a pump source for side pumping the microresonator. The microresonator includes an active gain medium and a Q-switch that extend lengthwise between the opposed end faces of the microresonator. The pump source is therefore positioned so as to introduce pump signals into the microresonator via the side surface that is adjacent to and defined by the active gain medium. By side pumping the microresonator, the microlaser can generate a series of pulses having greater pulse energies and greater average power levels than the pulses provided by conventional microlasers. In addition, the side pumped microlaser can also generate pulses having greater pulse widths than the pulses provided by conventional microlasers of a similar size. As such, the side pumped microlaser can be employed in more demanding applications that require pulses having greater pulse widths as well as pulses that have greater pulse energy and greater average power than are typically provided by conventional end pumped microlasers.

12 Claims, 1 Drawing Sheet

SIDE PUMPED, Q-SWITCHED MICROLASER

FIELD OF THE INVENTION

The present invention relates generally to microlasers and, more particularly, to side pumped microlasers comprising an active gain medium and a passive Q-switch medium within a monolithic material element, on which a pair of reflective surfaces are included to define a microresonator cavity.

BACKGROUND OF THE INVENTION

Modern electro-optical applications are demanding relatively inexpensive, miniaturized lasers capable of producing a series of well-defined output pulses. As such, a variety of microlasers have been developed which include a microresonator and a pair of at least partially reflective mirrors disposed at opposite ends of the microresonator to define a resonant cavity therebetween. The microresonator of one advantageous microlaser includes an active gain medium and a saturable absorber that serves as a Q-switch. See, for example, U.S. Pat. No. 5,394,413 to John J. Zayhowski which issued on Feb. 28, 1995, the contents of which are incorporated in their entirety herein. By appropriately pumping the active gain medium, such as with a laser diode, the microresonator will emit a series of pulses having a predetermined wavelength, pulse width and pulse energy.

As known to those skilled in the art, the energy of pulses emitted by a microlaser is dependent upon the materials from which the active gain medium and the saturable absorber are formed as well as the length and width of the optically pumped volume. All other factors being equal, the longer and wider the microresonator cavity, the greater the pulse energy and average power of the resulting laser pulses.

Conventional microlasers, such as those described by U.S. Pat. No. 5,394,413, are end pumped in a direction parallel to the longitudinal beam axis defined by the resonator cavity. In this regard, the longitudinal axis of the microresonator cavity extends lengthwise through the resonator cavity and is oriented so as to be orthogonal to the pair of at least partially reflective mirrors that define the opposed ends of the resonant cavity. As such, conventional microlasers are configured such that the pump source provides pump input in a direction perpendicular to the at least partially reflective mirrors that define the opposed ends of the resonant cavity. The effective length of the resonator cavity is therefore equal to the thickness of the monolithic medium comprising the resonator.

While the microlaser can be fabricated such that the resonator cavity has different lengths, a number of factors contribute to generally limit the permissible length of the resonator cavity. See, for example, U.S. Pat. No. 5,394,413 that states that the resonator cavity, including both the saturable absorber and the gain medium, is preferably less than two millimeters in length. In particular, a number of electrooptical applications require microlasers that are extremely small. As such, increases in the length of the resonator cavity are strongly discouraged in these applications since any such increases in the length of the resonator cavity would correspondingly increase the overall size of the microlaser. Additionally, it is difficult to fabricate monolithic microlasers longer than a few millimeters in length because of limitations in material growth processes, which would produce insufficiently uniform optical media to provide efficient output of good divergence and spectral purity.

Increasing the width of the resonator cavity, as might be achieved by focusing the pump source to a larger spot in the microresonator, would also be very undesirable because it would result in highly divergent output. This disadvantageous result is because a width increase will correspondingly increase the resonator Fresnel number, allowing multiple transverse modes to oscillate.

The relatively small size of conventional microlasers also limits the effectiveness with which heat generated by absorption of pump diode radiation can be removed. In certain instances, the heat generated within the microlaser may even exceed the thermal capacity of the heat sink or other heat removal device, thereby potentially distorting the medium and causing unacceptable degradation of the output beam power or quality.

The foregoing examples of practical limitations on the length of the resonator cavity also disadvantageously limit the pulse energy and average power of the pulses output by the conventional microlasers. The pulse energy and average power of the pulses emitted by a microlaser are also dependent upon the power level at which the active gain medium pumped, i.e., the power delivered by the pump inputs. Since conventional microlasers are end pumped, a single stripe laser diode is typically utilized as the pump source since the pump input generated by a single stripe laser diode generally fill the relatively small microlaser mode diameter. Unfortunately, the power delivered by a single stripe laser diode is typically limited to about 1 to 3 watts, thereby correspondingly limiting the pulse energy and average power of the pulses output by a conventional microlaser. In addition, multi-stripe diodes are generally not utilized to end pump a conventional microlaser since multi-stripe diodes focus poorly and, as a result, require complex optics to produce a small enough spot to generate single mode microlaser output.

In contrast, some modem electro-optical applications are beginning to require microlasers that emit pulses having greater pulse widths, such as pulse widths of greater than 1 nanosecond and, in some instances, up to 10 nanoseconds, as well as pulses that have greater pulse energy, such as between about 10 $\mu$J and about 100 $\mu$J, and greater average power, such as between 0.1 watts and 1 watt. As a result of the foregoing limitations on the length of the resonator cavity and the corresponding limitations on the pulse widths, pulse energy and average power of the pulses output by the conventional microlasers, conventional microlasers do not appear capable of meeting these increased demands.

SUMMARY OF THE INVENTION

A microlaser is therefore provided according to one embodiment of the present invention that has an active gain medium that is side pumped in order to generate a series of pulses having greater pulse energies and average power levels than the pulses provided by conventional microlasers. In addition, the microlaser of this embodiment can also generate pulses having greater pulse widths than the pulses provided by conventional microlasers of a similar size. As such, the microlaser of the present invention can be employed in more demanding applications that require pulses having greater pulse widths as well as pulses that have greater pulse energy and greater average power than are typically provided by conventional end pumped microlasers.

According to the present invention, the microlaser includes a microresonator having a monolithic material element comprising an active gain medium and a Q-switch. The microsonator extends lengthwise between oposed end faces and has a plurality of reflecting side surfaces extending between the opposed end faces. The microlaser also includes first and second reflective surfaces at both of the opposed end faces to define a microresonator cavity therebetween. Typically, the first and second reflective surfaces are coated upon the opposed end faces of the microresonators. However, a minilaser can be constructed according to another embodiment of the present invention in which the first and second reflective surfaces are formed by mirrors that are spaced from the opposed end faces.

The microlaser can also include a pump source for introducing pump signals, typically from multiple-element laser pump diodes, into the active gain medium via one of the side surfaces of the microresonator in order to side pump the microresonator, thereby permitting the microlaser of the present invention to have greater resonator length and width, and to emit pulses having greater pulse widths, pulse energies and average power levels than the pulses typically emitted by conventional microlasers of the same general size. The combination of greater length and small mode diameter allows the Fresnel number of the resonator to remain low, ensuring low order transverse mode output.

According to the present invention, the Q-switch extends lengthwise along another one of the side surfaces of the microresonator. Preferably, the Q-switch extends lengthwise along the side surface of the microresonator that is opposite the side surface through which the pump signals are introduced, thereby facilitating pumping of the active gain medium.

In order to permit the pump signals to be received by the active gain medium without first being reflected, the microlaser can include an antireflection coating on the side surface through which the pump signals are introduced so as to permit pump signals having a predetermined range of wavelengths to enter the active gain medium. The microlaser of this embodiment can also include a reflectance coating that is disposed upon the side surface of the microresonator along which the Q-switch extends for internally reflecting the pump signals, thereby insuring that the pump signals that have entered the active gain medium remain within the active gain medium. Alternatively, total internal reflection from the side surfaces may provide the required reflection.

In order to permit the microlaser to emit signals of a predetermined lasing wavelength via one of the opposed end faces, the first reflective surface is preferably highly reflective for laser signals having the predetermined lasing wavelength. In contrast, the second reflective surface is preferably only partially reflective for laser signals having the predetermined lasing wavelength. As such, the microlaser can emit laser pulses having the predetermined lasing wavelength via the second reflective surface.

In one advantageous embodiment, the opposed end faces are each disposed at a nonorthogonal angle α relative to a longitudinal axis defined by the microresonator cavity and extending between the opposed end faces. Typically, the opposed end faces are each disposed at the same nonorthogonal angle α relative to the longitudinal axis. As a result of the nonorthogonal relationship of the opposed end faces to the longitudinal axis defined by the microresonator cavity, the microlaser of this embodiment is capable of supporting a zig-zag resonation pattern in response to side pumping of the active gain medium, with each reflection utilizing near total internal reflection as the beam line bounces from the transverse surfaces of the microlaser medium.

By supporting the zig-zag resonation pattern, the effective length of the microresonator cavity is increased relative to conventional microlasers having substantially the same physical size. In this regard, the effective length of the microresonator cavity of this embodiment is the length of the zig-zag resonation path established by the microlaser which is significantly longer than the linear resonation paths established by conventional microlasers that extend parallel to the longitudinal axis of the resonator cavity. As such, the microlaser of the present invention can emit pulses having a longer pulse width and correspondingly greater pulse energies and average power levels than the pulses emitted by conventional microlasers of the same physical size. The greater length and width of the microlaser active medium also facilitates heat removal from the device.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
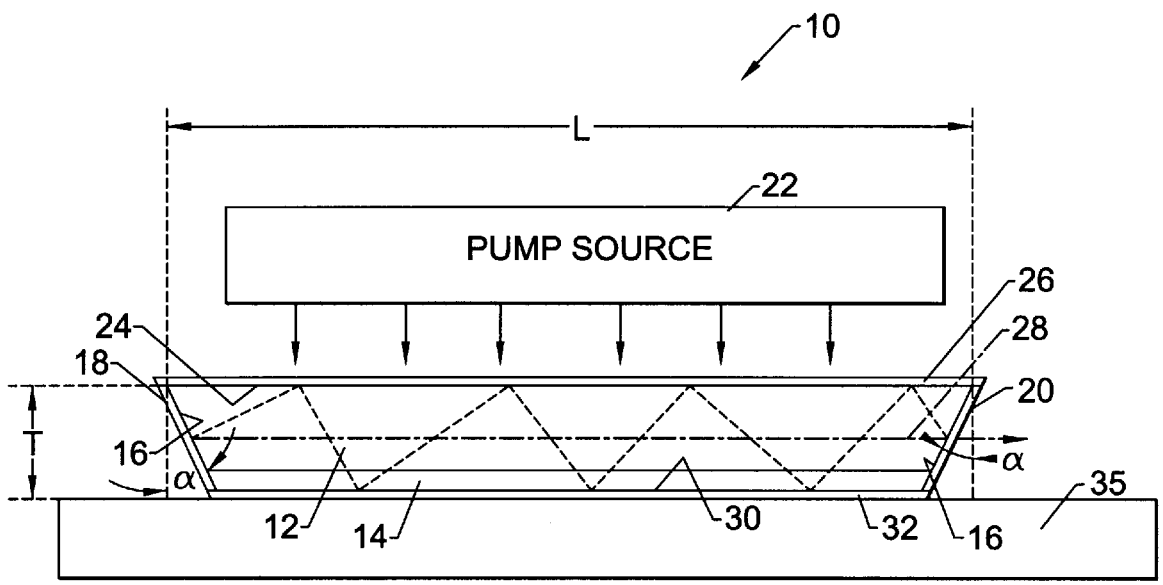
FIG. 1 is a side elevational view of a microlaser according to one embodiment of the present invention that has angled end faces for supporting a zig-zag resonation pattern.

Referring now to FIG. 1, a microlaser 10 according to one advantageous embodiment of the present invention is illustrated. The microlaser includes a microresonator having an active gain medium 12 and a Q-switch 14 immediately adjacent to the active gain medium. Although the active gain medium and the Q-switch can have different sizes, the microresonator of one embodiment has a total thickness T of 2 to 3 millimeters and a length L of 4 to 10 millimeters. In this embodiment, the active gain medium preferably has a thickness of approximately 1 to 2 millimeters and the Q-switch preferably has a thickness of approximately 1 millimeter.

Both the Q-switch 14 and the active gain medium 12 are formed of an appropriately doped host material. Typically, the host material is yttrium aluminum garnet (YAG), although materials such as yttrium vanadate ($YVO_4$) and yttrium lithium fluoride (YLF), can be employed. In addition, while a variety of dopants can be utilized, the active gain medium is typically doped with neodymium (Nd) and the saturable absorber is typically doped with tetravalent chromium. In one advantageous embodiment in which the active gain medium is epitaxially grown upon the Q-switch material, the active gain medium can more heavily doped than the active gain mediums of some conventional microlasers that are grown according to a Czochralski technique. For example, an active gain medium that is formed of YAG may be doped with between about 2 and about 3 atomic percent of Nd such that the resulting microresonator provides increased gain relative to conventionally doped microlasers. In this embodiment, the Q-switch or saturable absorber is also formed of YAG that is doped with tetravalent chromium and has an optical density of 0.03 to 0.1, for example. As will be apparent, however, the active gain medium and the saturable absorber can be doped with different atomic percentages and different types of dopant without departing from the spirit and scope of the present invention.

The microresonator of one advantageous embodiment can be fabricated in a variety of manners. For example, the active gain medium can be epitaxially grown upon the Q-switch, such as by liquid phase epitaxy as described in U.S. patent application Ser. No. 09/337,432 entitled Side Pumped, Q-Switched Microlaser and Associated Fabrication Method that is filed concurrently herewith, the contents of which are incorporated in their entirety herein. Similarly, the Q-switch can be epitaxially grown upon the active gain medium. In either instance, however, the resulting microresonator is a monolithic structure. In addition, the active gain medium and the Q-switch can be joined by a diffusion bond or by optical contact in which the active gain medium and the Q-switch are attracted with coherent forces, such as Van der Waals forces. In order to securely join the active gain medium and the Q-switch by diffusion bonding or optical contact, the abutting surfaces of the active gain medium and the Q-switch must be extremely clean and flat.

Regardless of the material selection and the method of fabrication, the saturable absorber serves as a passive Q-switch to prevent the onset of lasing until the inversion density within the microresonator is sufficiently high, i.e., above a predetermined threshold. Once lasing begins, however, the microresonator will produce a series of pulses of a predetermined wavelength, i.e., the lasing wavelength, that have a predetermined pulse width, albeit a longer pulse width than the laser pulses generated by conventional microlasers.

Since the microresonator is typically an elongate bar having a generally rectangular cross-section, the microresonator includes a plurality of side surfaces that extend lengthwise between opposed end faces 16. According to the present invention, the active gain medium 12 and the Q-switch 14 extend lengthwise between the opposed end faces. As such, the active gain medium is adjacent to and defines one of the side surfaces of the microresonator, while the Q-switch is adjacent to and defines an opposed side surface.

Figure 2:
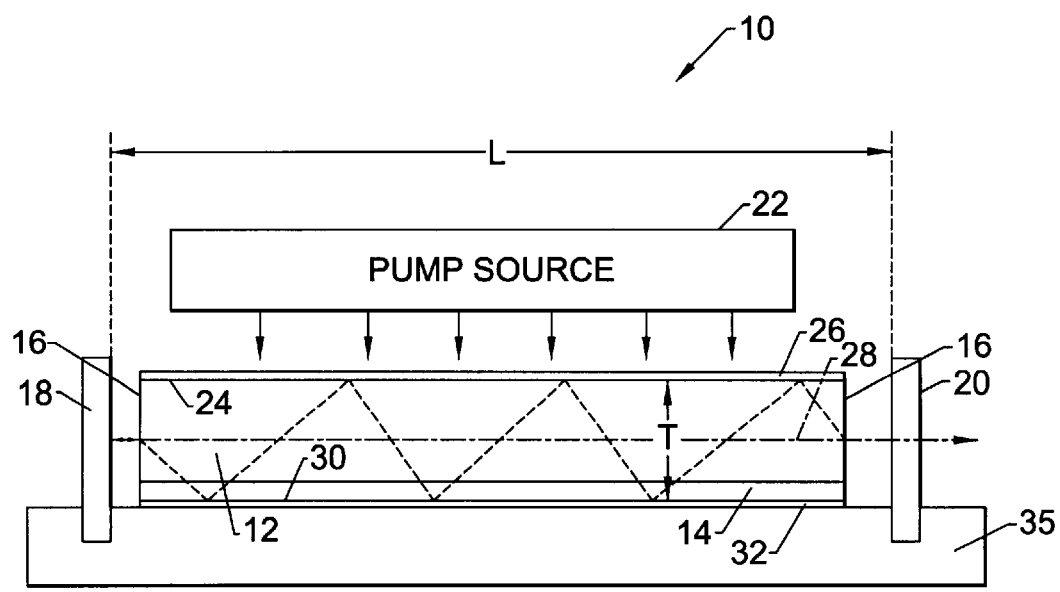
FIG. 2 is a side elevational view of a minilaser according to another advantageous embodiment of the present invention.

The microlaser 10 also includes first and second reflective surfaces 18, 20 disposed proximate respective ones of the opposed end faces 16 to define a microresonator cavity therebetween. As shown in FIG. 1, the first and second reflective surfaces can consist of a multi-layered dielectric coating that is deposited upon the opposed end faces. In an alternative embodiment in which a minilaser, as opposed to a microlaser, is constructed, the first and second reflective surfaces can be formed by first and second dichroic mirrors that are positioned proximate, but slightly spaced from respective ones of the opposed end faces as shown in FIG. 2.

In either embodiment, the first reflective surface 18 has a high reflectivity, such as a reflectivity of greater than 99.5%, for signals having the predetermined lasing wavelength, such as 1.064 nanometers for a microlaser having an active gain medium formed of Nd doped YAG. In addition, the second reflective surface 20 is a partial reflector, typically having a reflectivity of between 85% and 90% for signals having the predetermined lasing wavelengths. See also U.S. Pat. No. 5,394,413 which further describes a pair of mirrors that define the resonator cavity of a microlaser. Once the active gain medium 12 is pumped such that the inversion density within the microresonator is above the predetermined threshold, the Q-switch 14 will permit a series of pulses to be emitted. As a result of the partial reflectivity of the second reflective surface, the series of pulses will then be emitted through the second reflective surface.

The microlaser 10 also includes a pump source 22 for pumping the active gain medium 12 with pump signals. In contrast to conventional end-pumped microlasers, the microlaser of the present invention is side pumped. In this regard, the microresonator has a first side surface 24 extending between the opposed end faces 16 that is adjacent to and is defined by the active gain medium. By positioning the pump source such that the pump signals are delivered via the first side surface of the microresonator, the active gain medium is effectively side pumped.

Although the wavelength of the pump signals can be tailored to the specific materials that comprise the active gain medium 12, an active gain medium that is comprised of Nd doped YAG is typically pumped with pump signals having a wavelength of 808+/−3 nanometers. In order to permit the pump signals to be received by the active gain medium without being reflected from the first side surface 24, the microlaser preferably includes an antireflection coating 26 that is deposited upon the first side surface such that signals having the wavelength of the pump signals can enter the microresonator cavity with little, if any, reflection.

While the microlaser 10 can include a variety of pump sources 22, the microlaser of one advantageous embodiment utilizes one or more linear laser diode pump arrays that have a cumulative length that is no greater than and is typically somewhat shorter than the length of the microresonator as measured along its longitudinal axis 28. By utilizing a laser diode pump array, the energy delivered via the pump signal is increased dramatically relative to the energy provided by the pump signals of a single stripe laser diode that is typically utilized to end pump conventional microlasers. For example, a linear laser diode array having a length of about 1 cm generally provides pump signals that have an average power of 15–40 watts, as compared to the 1–3 watts of average power provided by the pump signals of a single stripe laser diode. As such, the microlaser of the present invention can produce pulses having greater pulse energy and average power than conventional end pumped microlasers.

In order to facilitate the side pumping of the microlaser 10, the side surface of the microresonator that is adjacent to and defined by the Q-switch 14 is preferably coated with a reflectance coating 32 that has a high reflectivity, such as a reflectivity of greater than 99.5%, for signals having the wavelength of the pump signals. In the embodiment in which the pump source delivers pump signals having a wavelength of 808+/−3 nanometers, for example, the reflectance coating is preferably designed to have a high reflectivity for signals having a wavelength of 808+/−3 nanometers. As shown in FIGS. 1 and 2, the Q-switch is preferably adjacent to and defines a second side surface 30 of the microresonator that is opposite the first side surface 24 through which the pump signals are received. As such, the reflectance coating is also preferably deposited upon the second side surface of the microresonator. While the reflectance coating deposited upon the second side surface and the antireflection coating 26 deposited upon the first side surface can be formed in a variety of manners, the reflectance coating and the antireflection coating are typically formed by the deposition of a plurality of dielectric layers having respective indices of refraction that are tailored to provide the proper reflectivity properties as known to those skilled in the art.

As shown in dashed lines in FIG. 1, the microlaser advantageously supports a zig-zag resonation pattern. Since the zig-zag resonation pattern typically encounters or intersects the Q-switch at several locations along the length of the microresonator cavity, the microresonator of the present invention can be considered to be a plurality of alternating gain and saturable loss regions that are disposed in a series arrangement with each Q-switch preventing lasing until the inversion density within the microresonator is sufficiently high, i.e., above a predetermined threshold.

The opposed end faces of the microresonator are each preferably disposed at a nonorthogonal angle $\alpha$ relative to the longitudinal axis. While the opposed end faces can be disposed at a variety of nonorthogonal angles $\alpha$ relative to the longitudinal axis, the opposed end faces are typically disposed at an angle $\alpha$ that is between about 30° and about 35° relative to a line perpendicular to the longitudinal axis and, more commonly, at an angle of about 30.9°.

The opposed end faces 16 can each be disposed at the same nonorthogonal angle $\alpha$ relative to the longitudinal axis 28 defined by the microresonator cavity. While the opposed end faces can be oriented in the same direction so as to be parallel to one another, the opposed end faces can, instead, be oriented in opposite directions by the same nonorthogonal angle $\alpha$ relative to the longitudinal axis defined by the microresonator cavity as shown in FIG. 1. In either instance, the resulting microresonator cavity supports the zig-zag resonation pattern as shown.

By supporting a zig-zag resonation pattern within the microresonator cavity, the effective length of the resonation pattern is significantly longer than the physical length of the microresonator cavity as measured along the longitudinal axis 28. In this regard, the effective length of the resonation pattern is defined by the path of the signals as the signals alternately bounce from the opposed side surfaces of the microresonator. For a microlaser 10 that is designed such that the signals reflect or bounce four times from the opposed side surfaces of the microresonator, the effective length of the zig-zag resonation pattern is about three to four times longer than the physical length of the microresonator cavity as measured along the longitudinal axis. Since the length of the resonation pattern and the physical length of the resonator cavity are identical for conventional end-pumped microlasers, the microlaser of the present invention advantageously provides a much longer resonation pattern without requiring that physical dimensions of the microresonator be increased.

As a result of the lengthened resonation pattern, the pulse energy and pulse duration of the pulses output by the microlaser 10 is increased relative to the pulses output by conventional microlasers of the same size. For example, the pulses output by the microlaser of the present invention are anticipated to have a pulse width of between 1 and 10 nanoseconds and, more typically, between about 2 and 5 nanoseconds, as compared to the pulses output by conventional end-pump microlasers of the same size which have subnanosecond pulse widths. As a result of the increased pulse width of the pulses emitted by the microlaser of the present invention as well as the capability to pump the microlaser with pump signals having greater average power levels, the energy delivered by the pulses output by the microlaser of the present invention should be significantly greater than the energy delivered by the pulses output by conventional end-pumped microlasers of the same size. In this regard, pulses having an energy up to about 100 $\mu$J are anticipated to be emitted by the microlaser of the present invention in comparison to pulse energies of less than about 35 $\mu$J that are provided by the pulses output by conventional end-pump microlasers of the same size. Correspondingly, the pulses emitted by the microlaser of the present invention are anticipated to have much greater average powers, such as 0.1 watts to 1 watt, than the average power of conventional end-pumped microlasers that is typically less than 0.1 watts.

While the microlaser 10 of the present invention can be mounted and packaged in a variety of manners, the microlaser typically further includes a heat sink 35 upon which the microresonator is mounted. As shown in FIG. 1, the microlaser is preferably mounted upon the heat sink such that the second side surface 30 that is adjacent to and defined by the Q-switch 14 faces the heat sink. As such, the first side surface through which the pump signal are introduced is not obstructed by the heat sink. Although a variety of active and passive heat sinks can be utilized, the heat sink of one advantageous embodiment is formed of a YAG crystal. Regardless of the type of heat sink, the microresonator is preferably attached to the heat sink by means of a thermally matched epoxy, such as an aluminum oxide filled or a silver filled epoxy or by mechanical mounting methods in conjunction with a heat transfer material, e.g., indium metal, heat sink grease, or the like. As described in the above-referenced U.S. patent application Ser. No. 09/337,432 entitled Side Pumped, Q-Switched Microlaser and Associated Fabrication Method, the microlaser also generally includes a housing in which the microresonator and the pump source 22 are disposed. As such, the pump source can be properly positioned with respect to the first side surface 24 of the microresonator and both the microresonator and the pump source can be protected from environmental and other deleterious conditions.

As will be apparent to those skilled in the art, the microlaser 10 of the present invention is extremely advantageous in its ability to deliver pulses having longer pulse widths and greater pulse energies than the pulses delivered by conventional end-pumped microlasers of substantially the same size. As such, the microlaser of the present invention is advantageous for a variety of applications, including marking, micromachining, LIDAR and other ranging applications.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A microlaser comprising:

a microresonator comprising an active gain medium and a Q-switch, said microresonator extending lengthwise between opposed end faces, said microresonator also having a plurality of side surfaces extending between the opposed end faces;

first and second reflective surfaces disposed proximate respective ones of the opposed end faces to define a microresonator cavity therebetween; and a pump source for introducing pump signals into the active gain medium via one of the side surfaces of said microresonator, wherein the Q-switch extends lengthwise along another of the side surfaces of said microresonator to thereby facilitate side pumping of the active gain medium.

2. A microlaser according to claim 1 wherein the side surface of said microresonator along which the Q-switch extends is opposite the side surface through which the pump signals are introduced.

3. A microlaser according to claim 1 wherein said pump source introduces pump signals having a wavelength within a predetermined range of wavelengths, and wherein the microlaser further comprises an antireflection coating upon the side surface through which the pump signals are introduced so as to permit the pump signals to be received by the active gain medium without being reflected from the side surface.

4. A microlaser according to claim 3 further comprising a reflectance coating upon the side surface of said microresonator along which the Q-switch extends for internally reflecting the pump signals.

5. A microlaser according to claim 4 wherein the side surface of said microresonator that is coated with said reflectance coating is opposite the side surface through which the pump signals are introduced.

6. A microlaser according to claim 1 wherein said microresonator is adapted to generate laser signals of a predetermined wavelength, and wherein said first reflective surface is highly reflective for laser signals having the predetermined wavelength while said second reflective surface is partially reflective for laser signals having the predetermined wavelength, thereby permitting laser signals to be emitted by the microlaser via said second reflective surface.

7. A microlaser according to claim 1 wherein the opposed end faces of said microresonator are each disposed at a nonorthogonal angle $\alpha$ relative to a longitudinal axis defined by the microresonator cavity.

8. A microlaser according to claim 7 wherein the opposed end faces are each disposed at the same nonorthogonal angle $\alpha$ relative to the longitudinal axis defined by said microresonator cavity.

9. A microlaser according to claim 1 wherein said pump source comprises at least one laser diode array.

10. A microlaser according to claim 1 wherein said microresonator is monolithic.

11. A microlaser according to claim 1 wherein the Q-switch is passive.

12. A microlaser according to claim 11 wherein said active gain medium is comprised of neodymium-doped yttrium aluminum garnet (YAG), and wherein said Q-switch is comprised of tetravalent chromium doped YAG.

* * * * *